(12) United States Patent
Earnshaw et al.

(10) Patent No.: US 11,664,902 B2
(45) Date of Patent: May 30, 2023

(54) PLANAR ASSEMBLIES FOR OPTICAL TRANSCEIVERS

(71) Applicant: Nokia Solutions and Networks OY, Espoo (FI)

(72) Inventors: Mark P. Earnshaw, Berkeley Heights, NJ (US); Cristian A. Bolle, Bridgewater, NJ (US); David T Neilson, Holmdel, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 450 days.

(21) Appl. No.: 16/544,176

(22) Filed: Aug. 19, 2019

(65) Prior Publication Data

US 2021/0058158 A1   Feb. 25, 2021

(51) Int. Cl.
    *H04B 10/00*      (2013.01)
    *H04B 10/40*      (2013.01)
    *H04J 14/02*      (2006.01)

(52) U.S. Cl.
    CPC .............. *H04B 10/40* (2013.01); *H04J 14/02* (2013.01)

(58) Field of Classification Search
    USPC ............................... 398/135–139; 385/88–92
    See application file for complete search history.

(56) References Cited

U.S. PATENT DOCUMENTS

| | | | | |
|---|---|---|---|---|
| 6,219,470 B1 * | 4/2001 | Tu | ........................ | G02B 6/4204 385/14 |
| 6,222,967 B1 * | 4/2001 | Amano | .................... | G02B 6/30 385/49 |
| 6,385,374 B2 * | 5/2002 | Kropp | .................. | G02B 6/4246 385/24 |
| 6,493,121 B1 * | 12/2002 | Althaus | ................ | G02B 6/4246 398/135 |
| 7,203,391 B2 * | 4/2007 | Uekawa | ............. | G02B 6/29361 385/14 |

(Continued)

OTHER PUBLICATIONS

International Telecommunication Union Recommendation, Recommendation G.709/Y.1331, "Interfaces for the optical transport network", Jun. 2016: (244 pages).

(Continued)

*Primary Examiner* — Agustin Bello
(74) *Attorney, Agent, or Firm* — Mendelsohn Dunleavy, P.C.; Steve Mendelsohn; Yuri Gruzdkov

(57) ABSTRACT

Planar assemblies for coupling a plurality of optical transceivers to the same optical fiber. For example, the optical transceivers may be PON transceivers functioning according to different data rates and/or different modulation formats. Each optical transceiver communicates using one or more different wavelength channels. At least some of the disclosed planar assemblies are scalable to couple various numbers of optical transceivers to the same end face of an optical fiber, e.g., by fixing a corresponding number of passive, slab-like optical filters to a substantially planar surface of the support substrate to which the optical transceivers are also fixed adjacent and along. Some embodiments may employ various bulk lenses fixed to said planar surface to suitably relay light-beam segments between the end face of the fiber and the optical transceivers and/or between the different slab-like optical filters.

20 Claims, 5 Drawing Sheets

(56) References Cited

U.S. PATENT DOCUMENTS

| | | | | |
|---|---|---|---|---|
| 7,218,451 B2* | 5/2007 | Lee | G02B 6/12007 | 359/246 |
| 7,450,858 B2* | 11/2008 | Verdiell | H01S 5/4087 | 398/164 |
| 7,486,846 B2* | 2/2009 | Warashina | G02B 6/4246 | 385/14 |
| 7,729,569 B2* | 6/2010 | Beer | G02B 6/4204 | 385/14 |
| 7,945,169 B2* | 5/2011 | Oki | G02B 6/4246 | 174/254 |
| 8,165,433 B2* | 4/2012 | Jenkins | G02B 6/3596 | 385/125 |
| 8,335,411 B2* | 12/2012 | Kuznia | G02B 6/4214 | 385/14 |
| 8,469,610 B2* | 6/2013 | Shao | G02B 6/4292 | 385/93 |
| 8,923,670 B2* | 12/2014 | Zbinden | G02B 6/4214 | 385/33 |
| 8,985,871 B2* | 3/2015 | Mizobuchi | G02B 6/43 | 385/14 |
| 9,191,118 B2* | 11/2015 | Hui | H04B 10/2503 | |
| 9,223,123 B2* | 12/2015 | Trzeciakowski | G02B 19/0028 | |
| 9,235,014 B2* | 1/2016 | Wang | G02B 6/4214 | |
| 9,250,401 B2* | 2/2016 | Lim | G02B 6/4215 | |
| 9,419,717 B2* | 8/2016 | Huang | G01J 1/0271 | |
| 9,479,258 B1* | 10/2016 | Wolff | H04B 10/40 | |
| 9,541,714 B2* | 1/2017 | Lim | G02B 6/42 | |
| 9,709,746 B2* | 7/2017 | Heroux | G02B 6/29368 | |
| 9,749,054 B2* | 8/2017 | Ben Ezra | G02F 1/015 | |
| 9,753,223 B2* | 9/2017 | Yang | G02B 6/28 | |
| 9,784,919 B2* | 10/2017 | Wang | G02B 6/2938 | |
| 9,971,089 B2* | 5/2018 | Zhang | G02B 6/12004 | |
| 9,977,200 B2* | 5/2018 | Lin | G02B 6/4246 | |
| 10,044,445 B2* | 8/2018 | Ho | G02B 6/4249 | |
| 10,222,564 B2* | 3/2019 | Jou | H04B 10/67 | |
| 10,345,542 B2* | 7/2019 | Rockman | G02B 6/3652 | |
| 2003/0063844 A1* | 4/2003 | Caracci | G02B 6/29362 | 385/24 |
| 2003/0190124 A1* | 10/2003 | Kuhara | G02B 6/421 | 385/88 |
| 2004/0105161 A1* | 6/2004 | Tatum | G02B 27/145 | 359/634 |
| 2004/0208601 A1 | 10/2004 | Tan et al. | | |
| 2005/0117201 A1* | 6/2005 | Yamane | G02B 6/29362 | 359/333 |
| 2005/0191057 A1* | 9/2005 | Nakamoto | G02B 6/4246 | 398/135 |
| 2006/0088255 A1* | 4/2006 | Wu | G02B 6/2938 | 385/92 |
| 2006/0274999 A1* | 12/2006 | Wu | G02B 6/4214 | 385/92 |
| 2007/0280605 A1* | 12/2007 | Mendoza | G01D 5/35383 | 385/92 |
| 2008/0055589 A1* | 3/2008 | Asami | G01M 11/3127 | 356/73.1 |
| 2008/0226228 A1* | 9/2008 | Tamura | G02B 6/4214 | 385/33 |
| 2008/0247713 A1* | 10/2008 | Tamura | G02B 6/4206 | 385/93 |
| 2009/0034983 A1* | 2/2009 | Shinoda | G02B 6/4246 | 398/141 |
| 2010/0086310 A1* | 4/2010 | Lee | H04B 10/40 | 398/138 |
| 2010/0209103 A1* | 8/2010 | Sakigawa | G02B 6/4201 | 398/45 |
| 2010/0267049 A1* | 10/2010 | Rutter | G01N 21/6428 | 435/7.1 |
| 2011/0058771 A1* | 3/2011 | Lee | G02B 6/4215 | 385/33 |
| 2011/0311229 A1* | 12/2011 | Kondo | G02B 6/4215 | 398/79 |
| 2013/0039662 A1* | 2/2013 | Brooks | G02B 6/12007 | 398/91 |
| 2015/0104129 A1* | 4/2015 | Nakagawa | G02B 6/43 | 385/14 |
| 2015/0153522 A1* | 6/2015 | Nakagawa | G02B 6/4215 | 385/31 |
| 2015/0188659 A1 | 7/2015 | Lipson et al. | | |
| 2016/0164612 A1 | 6/2016 | Wilks et al. | | |
| 2019/0140761 A1 | 5/2019 | Chan et al. | | |

OTHER PUBLICATIONS

International Telecommunication Union Recommendation, Recommendation G.989.2, "40-Gigabit-capable passive optical networks 2 (NG PON2): Physical media dependent (PMD) layer specification", Feb. 2019: (122 pages).

International Telecommunication Union Recommendation, Recommendation G.9807.2, "10 Gigabit-capable passive optical networks (XG(S)-PON): Reach extension", Aug. 2017: (48 pages).

International Telecommunication Union Recommendation, Recommendation G.694.1, "Spectral grids for WDM applications: DWDM frequency grid", Feb. 2012: (16 pages).

Huh, Joon Young, et al. "Highly alignment tolerant and high-sensitivity 100Gb/s (4× 25Gb/s) APD-ROSA with a thin-film filter-based de-multiplexer." Optics Express 24.24 (2016): pp. 27104-27114.

Murao, Tadashi, et al. "Integrated Spatial Optical System for Compact 28-GB/sx4-lane Transmitter Optical Subassemblies." IEEE Photonics Technology Letters 26.22 (2014): pp. 2275-2278.

Jung, Youngbeom, et al. "Four-channel signal-receiver optical subassembly module using a thin-film filter-based coarse-wavelength-division-multiplexing demultiplexer for monitoring 22.9-kV XLPE cable joints." Optical Engineering 57.10 (2018): 100505.

Choi, Jae-Shik, et al. "Optical coupling efficiency of bidirectional transceiver sub-module with refractive index control." Technical Digest. CLEO/Pacific Rim'99. Pacific Rim Conference on Lasers and Electro-Optics (Cat. No. 99TH8464). vol. 4. IEEE. (1999): pp. 1208-1209.

Mikkelsen, Benny "Tackling Capacity and Density Challenges by Electro-photonic Integration", Presentation, Optical Fiber Communication Conference and Exhibition (OFC), San Diego, California (2019): (32 pages).

Harstead, E. et al., "Optimal split ratio and channel capacity of point to multipoint networks for FITL." Proc. IEEE 4th Workshop on Optical Local Networks, 1992: (8 pages).

* cited by examiner

100

200

400

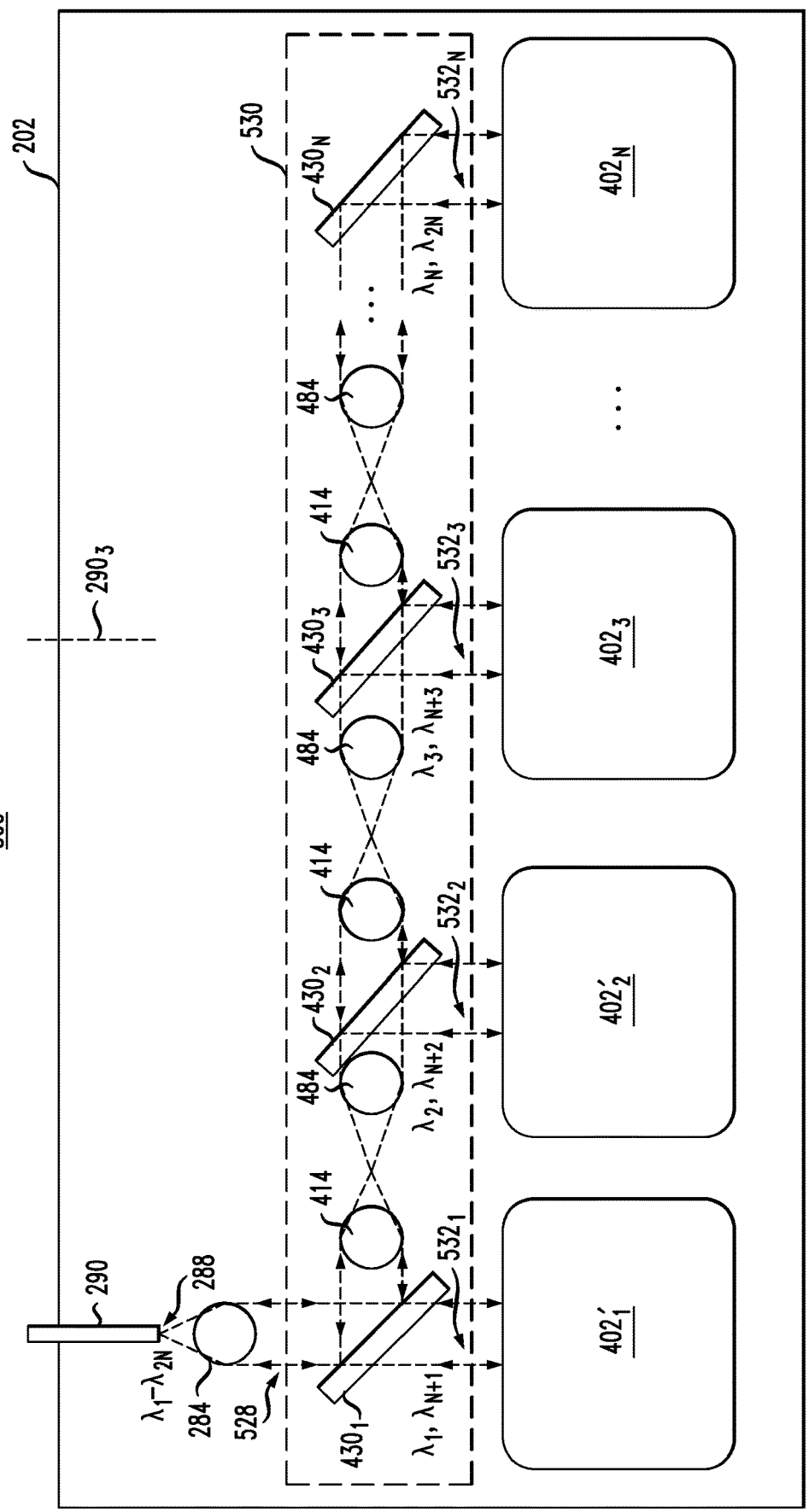

PLANAR ASSEMBLIES FOR OPTICAL TRANSCEIVERS

BACKGROUND

Field

Various example embodiments relate to optical communication equipment and, more specifically but not exclusively, to optical transmitters and receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

A fiber-optic system typically employs an optical transmitter at one end of an optical fiber line and an optical receiver at the other end of the optical fiber line. Some fiber-optic systems operate by transmitting in one direction on one carrier wavelength and in the opposite direction on another carrier wavelength to achieve full duplex (FDX) operation. An FDX system can be implemented using optical transceivers, wherein each optical transceiver includes a respective optical transmitter and a respective optical receiver, which may be physically integrated. The telecom industry and its suppliers develop, manufacture, sell, and use a large variety of optical transceivers for many different applications.

SUMMARY OF SOME SPECIFIC EMBODIMENTS

Some embodiments herein include planar assemblies enabling the coupling of a plurality of optical transceivers to the same optical fiber. For example, the optical transceivers may be passive-optical-network (PON) transceivers functioning according to different data rates and/or different modulation formats. Each optical transceiver communicates using one or more different wavelength channels. At least some of the disclosed planar assemblies belong to scalable architectures. Thus, the planar assemblies may be in embodiments coupling various numbers of optical transceivers to the same end face of an optical fiber, e.g., by fixing a corresponding number of passive, slab-like optical filters to a substantially planar surface of the support substrate to which the optical transceivers are also fixed adjacent and along. Some embodiments may employ various bulk lenses fixed to said planar surface to suitably relay light-beam segments between the end face of the fiber and the optical transceivers and/or between the different slab-like optical filters. In some embodiments, a planar assembly may be configured to couple some of the optical transceivers to end faces of at least two different optical fibers.

According to an example embodiment, provided is an apparatus comprising: a substrate having a substantially planar surface; first and second optical transceivers fixed to said substrate adjacent and along said planar surface, the first and second optical transceivers having non-overlapping footprints on said planar surface; and a passive optical filter fixed to said substrate and configured to direct along said planar surface, between an end face of an optical fiber and the first optical transceiver, light of first wavelengths, and to direct along said planar surface, between the end face and the second optical transceiver, light of second wavelengths, the first wavelengths being different from the second wavelengths.

In some embodiments of the above apparatus, the apparatus further comprises a connector fixed to the substrate to stabilize an end segment of the optical fiber along said planar surface, the end segment including the end face.

BRIEF DESCRIPTION OF THE DRAWINGS

Other aspects, features, and benefits of various disclosed embodiments will become more fully apparent, by way of example, from the following detailed description and the accompanying drawings, in which:

FIG. 5 shows a schematic top view of yet another electro-optical device that can be used in the optical communication system of FIG. 1 according to an embodiment.

DETAILED DESCRIPTION

Figure 1:
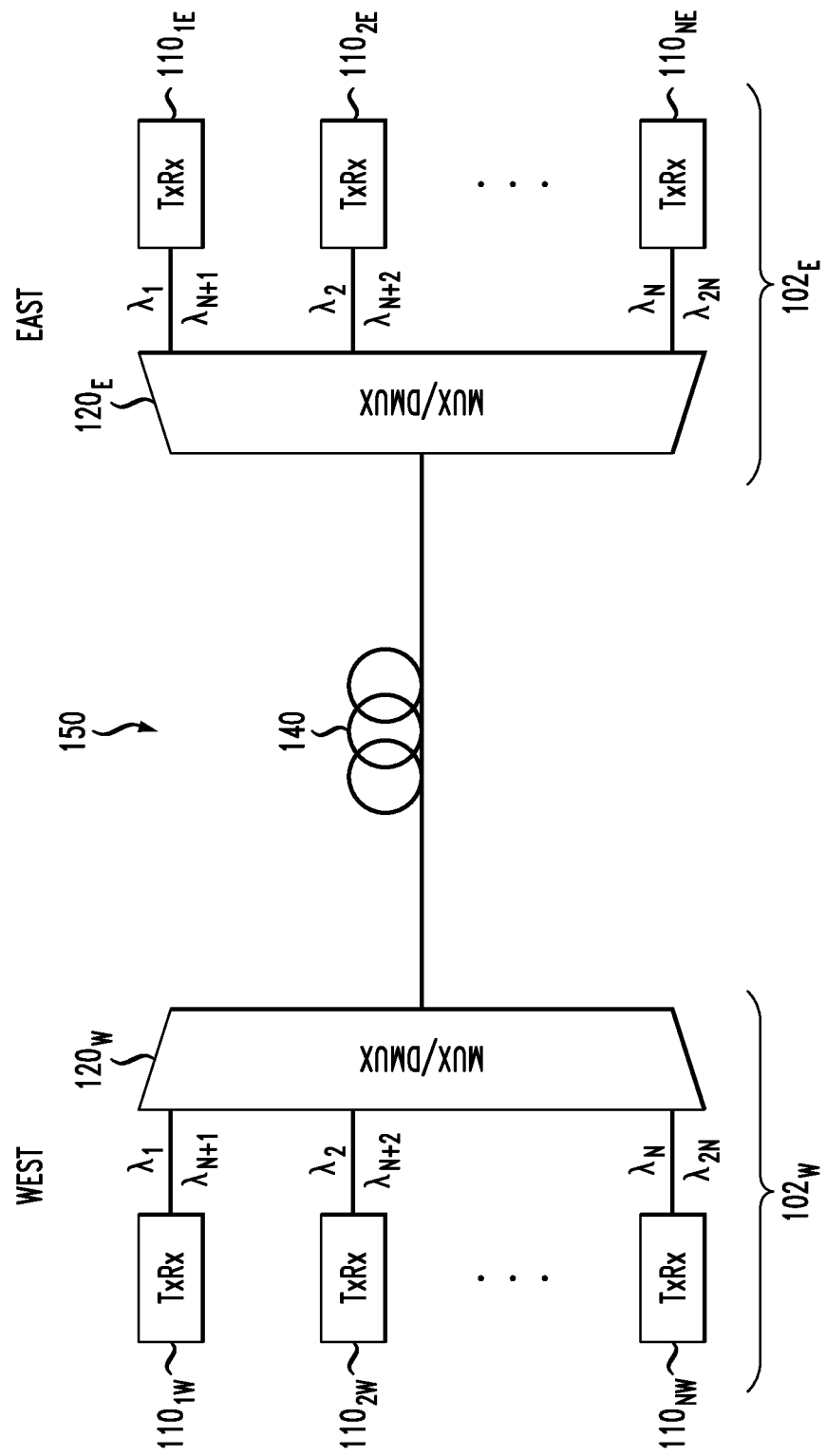
FIG. 1 shows a block diagram of an optical communication system according to an embodiment.

FIG. 1 shows a block diagram of an optical communication system 100 according to an embodiment. System 100 comprises wavelength-division-multiplexing (WDM) transceivers $10_{2W}$ and $102_E$ connected using a fiber-optic link 150. For illustration purposes and to simplify the description, WDM transceivers $10_{2W}$ and $102_E$ are referred-to herein as being located at the West and East ends, respectively, of link 150. This notation should not be interpreted to imply any preference or limitation with respect to the geo-positioning of system 100. For example, one of the WDM transceivers, e.g., transceiver $10_{2W}$ may have some of its individual transceivers 110 located at relatively remote locations.

In some embodiments, system 100 complies with the ITU-T G.709/Y.1331 Recommendation, which is incorporated herein by reference in its entirety.

In an example embodiment, link 150 can be implemented using one or more spans of optical fiber 140. In addition, link 150 may optionally have one or more optical amplifiers (not explicitly shown in FIG. 1), e.g., each connected between ends of two respective spans of fiber 140. In some embodiments, link 150 may incorporate additional optical elements (not explicitly shown in FIG. 1), such as optical splitters, combiners, couplers, switches, etc., as known in the pertinent art. In some embodiments, link 150 may not have any optical amplifiers therein.

In an example embodiment, WDM transceivers $10_{2W}$ and $102_E$ are configured to use carrier wavelengths $\lambda_1$-$\lambda_{2N}$, with the carrier wavelengths $\lambda_1$-$\lambda_N$ being used to transmit optical signals in the Eastward direction, and the carrier wavelengths $\lambda_{N+1}$-$\lambda_{2N}$ being used to transmit optical signals in the Westward direction. In some embodiments, the carrier wavelengths may be arranged on one or more frequency (wavelength) grids, such as the frequency grids that comply with one or more of ITU-T G.694.1, ITU-T G.989.2, and ITU-T G.9807 Recommendations, which are incorporated herein by reference in their entirety. For example, different respective frequency grids may be used for the Eastward and Westward directions.

In an example embodiment, a frequency grid used in system 100 can be defined, e.g., in a frequency range between about 180 THz and about 220 THz, with a 500, 200, 100, 50, 25, or 12.5-GHz spacing of the channels therein. While typically defined in frequency units, the parameters of the grid can equivalently be expressed in wavelength units. For example, in the wavelength range from about 1528.8 nm to about 1563.9 nm, the 100-GHz spacing between the centers of neighboring WDM channels is equivalent to approximately 0.8 nm spacing. In alternative embodiments, other suitable frequency grids (e.g., flexible or having other spacing grids) can also be used.

In some embodiments, system 100 can be configured to transport polarization-division-multiplexed (PDM) signals, wherein each of the two orthogonal polarizations of each optical WDM channel can be used to carry a different respective data stream.

In an example embodiment, WDM transceiver $10_{2W}$ comprises N individual transceivers $110_{1W}$-$110_{NW}$, where the number N is an integer greater than one. Each of transceivers $110_{1W}$-$110_{NW}$ comprises a respective optical transmitter (not explicitly shown in FIG. 1; e.g., see FIGS. 3-4) configured to generate a respective WDM component of the Eastward-propagating optical WDM signal using a different respective carrier wavelength (e.g., one of wavelengths $\lambda_1$-$\lambda_N$, as indicated in FIG. 1). A multiplexer/demultiplexer (MUX/DMUX) $120_W$ operates to combine (multiplex) these WDM components, thereby generating the corresponding Eastward-propagating optical WDM signal that is applied to link 150 for transmission to WDM transceiver $102_E$.

Each of transceivers $110_{1W}$-$110_{NW}$ further comprises a respective optical receiver (not explicitly shown in FIG. 1; e.g., see FIGS. 3-4) configured to detect a respective WDM component of the Westward-propagating optical WDM signal received through link 150 from WDM transceiver $102_E$. MUX/DMUX $120_W$ operates to separate (demultiplex) the WDM components of the received Westward-propagating optical WDM signal, thereby generating optical input signals for the optical receivers of the individual-channel transceivers $110_{1W}$-$110_{NW}$. In an example embodiment, each of such optical input signals has a different respective carrier wavelength (e.g., one of wavelengths $\lambda_{N+1}$-$\lambda_{2N}$, as indicated in FIG. 1).

In an example embodiment, WDM transceiver $102_E$ can be constructed using components similar to those of WDM transceiver $10_{2W}$ and configured to operate in a similar manner. A description of WDM transceiver $102_E$ for such embodiments can therefore be substantially obtained from the above description of WDM transceiver $10_{2W}$, e.g., by interchanging the subscripts E and W.

In some embodiments, system 100 may be constructed to implement a passive optical network (PON) or a part thereof. A typical PON has a point-to-multipoint architecture in which a passive optical router (e.g., a passive optical splitter) is used to enable an optical line terminal (OLT) located at a central office to send data transmissions to and receive data transmissions from optical network units (ONUs) located at different respective customer sites. In such embodiments, WDM transceiver $10_{2W}$ may be a part of the OLT and be constructed such that different components thereof are not farther away from each other than about 10 m. On the other hand, in a typical PON embodiment of system 100, some of individual transceivers $110_{1E}$-$110_{NE}$ may be separated from one another by relatively large distances, e.g., more than 20 m, and more typically by about 100 m or more. Also, MUX/DMUX $120_E$ may be implemented using a passive optical router whose one or more components are located at a relatively large distance, e.g., 1 km or more, from any one of the individual transceivers $110_{1E}$-$110_{NE}$.

Figure 2:
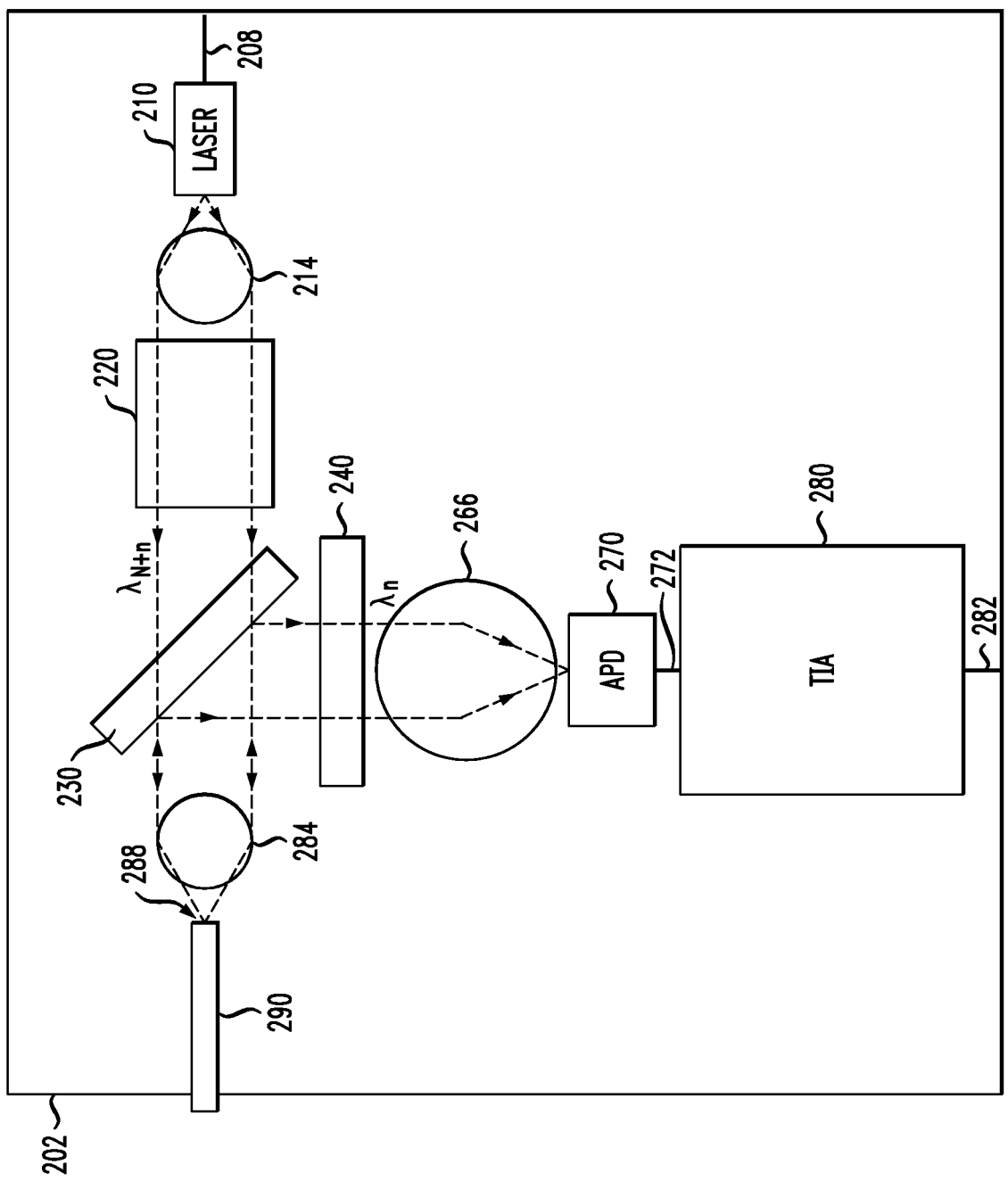
FIG. 2 shows a schematic top view of an electro-optical device that can be used in the optical communication system of FIG. 1 according to an embodiment.

FIG. 2 shows a schematic top view of an electro-optical device 200 that can be used to implement an individual optical transceiver 110 (FIG. 1) according to an embodiment. For illustration purposes and without any implied limitations, device 200 is described below with wavelength notations corresponding to a transceiver $110_{nE}$, where $1 \leq n \leq N$ (also see FIG. 1). As described, device 200 can be used, e.g., in some of the above-described PON embodiments of system 100. A person of ordinary skill in the art will understand, without any undue experimentation, how to adapt device 200 for any pertinent uses in system 100 and/or other optical communication systems.

Device 200 is constructed using a plurality of components and discrete elements appropriately arranged and mounted on a main surface of a substrate 202, e.g., a substantially planar surface. In other words, substrate 202 is a common substrate to some or all of those components and discrete elements. Some components and/or discrete elements may be mounted on substrate 202 using appropriate support structures, e.g., holders, mounts, connectors, etc., attached to the main surface of the substrate. The heights of such support structures may vary and be selected, e.g., to provide proper optical alignment within device 200.

As used herein, the term "substrate" refers to a circuit or device carrier, a plate, a board, or a base designed and configured to provide and/or support electrical and/or optical connections between different parts thereof to enable proper operation of electrical, optical, and/or optoelectronic components located at, mounted on, or connected to those parts. Such components may include any combination of packaged or non-packaged electronic integrated circuits, photonic integrated circuits, and discrete (e.g., lumped) elements. Electrical connections between different parts of the substrate can be formed, e.g., using patterned conducting (such as metal) layers located within the body or on the surface of the substrate and/or conventional electrical wiring. Optical connections between different optical and/or optoelectronic components on the substrate can be formed through free space, e.g., using discrete optical elements mounted on the substrate. In some embodiments, the substrate may have several distinct levels, e.g., comprising a redistribution layer (RDL), an interposer, a laminated plate, and/or a printed circuit board.

In some example embodiments, a substrate can be implemented using a semiconductor wafer, e.g. a silicon or silicon on insulator (SOI) wafer substrate, or a silicon optical bench (SiOB). A main surface of such a substrate can be micro-machined to enable precise optical alignment of various optical components placed thereon.

In some embodiments, a substrate can be a substrate whose lateral dimensions (e.g., length and width) are significantly larger than its thickness. In the view shown in FIG. 2, the thickness of substrate 202 is the dimension thereof measured along the Z-coordinate axis, and the lateral dimensions are the dimensions measured along the X- and Y-coordinate axes. An exterior surface of substrate 202 that is substantially parallel to the XY-coordinate plane may be referred to as a "main" surface of the substrate. In contrast, exterior surfaces of the substrate that have one relatively large size, e.g., length, and one relatively small size, e.g., height, may typically be referred to as the edges of the substrate.

A main surface of a substrate may be referred to as being substantially planar if feature-height variation thereon is significantly smaller than the smaller one of the two lateral sizes of the substrate. In some cases, a main surface of a substrate may be referred to as being substantially planar if the feature-height variation thereon is significantly smaller than the thickness of the substrate.

Device 200 comprises a laser 210, a photodiode (e.g., an avalanche photodiode, APD) 270, and an optical fiber 290, all mounted on a main (e.g., top) surface of substrate 202 to appropriately optically couple the laser and photodiode to a proximate end 288 of the fiber. Laser 210 can be used in the optical transmitter of the corresponding transceiver 110. Photodiode 270 can be used in the optical receiver of the corresponding transceiver 110.

In an example embodiment, laser 210 is a directly modulated laser configured to emit light of carrier wavelength $\lambda_{N+n}$. In operation, laser 210 emits modulated light in response to a drive signal received through an electrical port 208, e.g., from an external drive circuit or data source. Relay optics, e.g., comprising ball lenses 214 and 284, is used to couple the emitted light, through end 288, into optical fiber 290. Ball lenses 214 and 284 are both mounted on the top surface of substrate 202.

In some embodiments, laser 210 may be replaced, e.g., as known in the pertinent art, by a pulsed or continuous-wave (CW) laser outfitted with an external (e.g., located outside the laser cavity) optical modulator.

Photodiode 270 is optically coupled to end 288 of fiber 290 using ball lenses 266 and 284. Similar to ball lenses 214 and 284, ball lens 266 is mounted on the top surface of substrate 202. In response to light received from fiber 290, photodiode 270 generates a corresponding electrical output 272, which is then amplified using an electrical amplifier (e.g., transimpedance amplifier, TIA) 280. A resulting amplified signal is applied to an electrical port 282 for transmission to external circuits. In some embodiments, electrical amplifier 280 can be implemented using an integrated circuit mounted on the top surface of substrate 202.

In some embodiments, optical fiber 290 may be supported on a separate support structure, e.g., a fiber connector that is not mounted on substrate 202. The end segment of optical fiber 290 having the end face 288 may be oriented, e.g., substantially orthogonally to the main surface of substrate 202, and a mirror (not shown in FIG. 2) may be used in a conventional manner to change the propagation direction of the corresponding light beam(s) for efficient light coupling into and out of the optical fiber 290 so oriented. In some embodiments, the orientation angle of the optical fiber 290 with respect to the main-surface normal can be any suitable angle between 0 and 90 degrees.

Device 200 further comprises an optical wavelength diplexer 230 mounted on the top surface of substrate 202 and optically coupled to ball lenses 214, 266, and 284, e.g., as indicated in FIG. 2. Wavelength diplexer 230 is an optical filter that: (i) passes through (e.g., transmits) optical signals in an optical band corresponding to the wavelength $\lambda_{N+n}$; and (ii) redirects (e.g., reflects) optical signals in a different optical band corresponding to the wavelength $\lambda_n$.

In an example embodiment shown in FIG. 2, diplexer 230 is implemented using a rectangular slab made of an optically transparent material (e.g., glass) that has one or more thin dielectric films deposited on one or both sides thereof. The optical properties and the thickness of the slab 230 and/or the thin film(s) thereon are selected such as to support the above-indicated spectral function of the diplexer. The orientation of the slab 230 is such that: (i) an optical signal of carrier wavelength $\lambda_{N+n}$ emitted by laser 210 passes through the slab and is coupled into fiber 290; and (ii) an optical signal of carrier wavelength $\lambda_n$ emitted by fiber 290 is reflected by the slab and impinges on photodiode 270.

Although, as shown in FIG. 2, the slab 230 is oriented at 45 degrees with respect to the optical axis corresponding to ball lenses 214 and 284, other orientation angles can also be used in some alternative embodiments. A person of ordinary skill in the art will understand how to reposition ball lens 266 and photodiode 270 to achieve proper optical alignment/coupling of the latter in such alternative embodiments. In some alternative embodiments, an additional optical element, such as an angled mirror (not shown in FIG. 2), may be used to properly orient the various relevant light beam segments with respect to the slab 230.

Device 200 further comprises an optical isolator 220 located between diplexer 230 and lens 214. Optical isolator 220 is mounted on the top surface of substrate 202. In operation, optical isolator 220 transmits light substantially in one direction, e.g., as indicated in FIG. 2. This property of optical isolator 220 is used to prevent unwanted feedback into an optical oscillator (e.g., cavity) of laser 210.

Device 200 further comprises an optical filter 240 located between diplexer 230 and lens 266. Filter 240 is mounted on the top surface of substrate 202. The optical properties of filter 240 are selected such as to prevent most of spurious unwanted light from reaching photodiode 270. In an example embodiment, filter 240 can be a conventional band-pass optical filter or a low-pass optical filter, e.g., implemented using a colored glass plate.

In some embodiments, photodiode 270 can be replaced by a photodetector that enables coherent detection. Such a photodetector may include two or more photodiodes and, in some embodiments, an optical mixer, such as an optical hybrid or a polarization mixer. For such embodiments, a person of ordinary skill in the art will understand how to modify or replace amplifier 280 to make the resulting electrical circuit compatible with the used photodetector.

In some embodiments, some or all of ball lenses 214, 266, and 284 may be made of different respective materials (e.g., having different refractive indices) to adjust beam sizes and/or have different sizes (e.g., diameters) to adjust the beam-segment heights and angles.

In some embodiments, some or all of ball lenses 214, 266, and 284 may be replaced by suitable lenses of other shapes, e.g., various bulk optical lenses.

Figure 3:
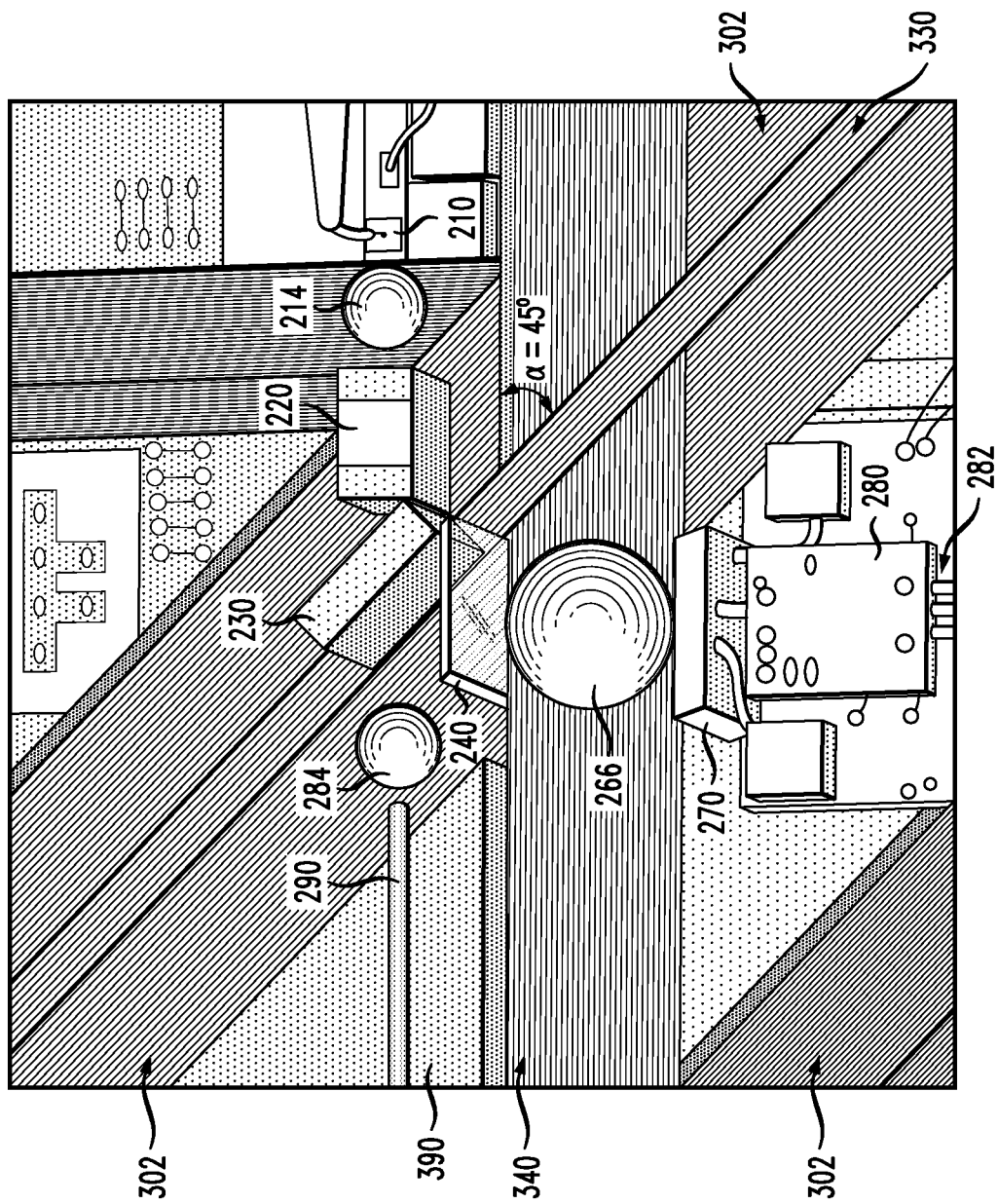
FIG. 3 illustrates a three-dimensional perspective view of the electro-optical device of FIG. 2 according to an embodiment.

FIG. 3 illustrates a three-dimensional perspective view of electro-optical device 200 (FIG. 2) according to an embodiment. More specifically, FIG. 3 shows an angled top view of device 200 in which a substantially planar top surface 302 of substrate 202 is clearly visible. In the shown embodiment, top surface 302 is textured for better and/or more-convenient attachment thereto of the various device components. Top surface 302 also has a shallow groove 330 that has a width and orientation that enable easier and/or more accurate placement and attachment of the diplexer slab 230 on surface 302. Top surface 302 further has a shallow groove 340 that has a width and orientation that enable and/or more accurate easier placement and attachment of the filter plate 240. The angle $\alpha$ between the grooves 330 and 340 is, e.g., 45 degrees.

As shown in FIG. 3, device 200 comprises a holder 390 configured to fixedly hold the end segment of fiber 290 at a proper height and orientation, slightly above top surface 302. In some embodiments, holder 390 may have a V-shaped groove into which the end segment of fiber 290 can be conveniently inserted. Holder 390 is mounted on and directly attached to top surface 302.

Other components and elements of device 200 that have been previously described in reference to FIG. 2 are labeled in FIG. 3 using the same reference numerals.

Figure 4:
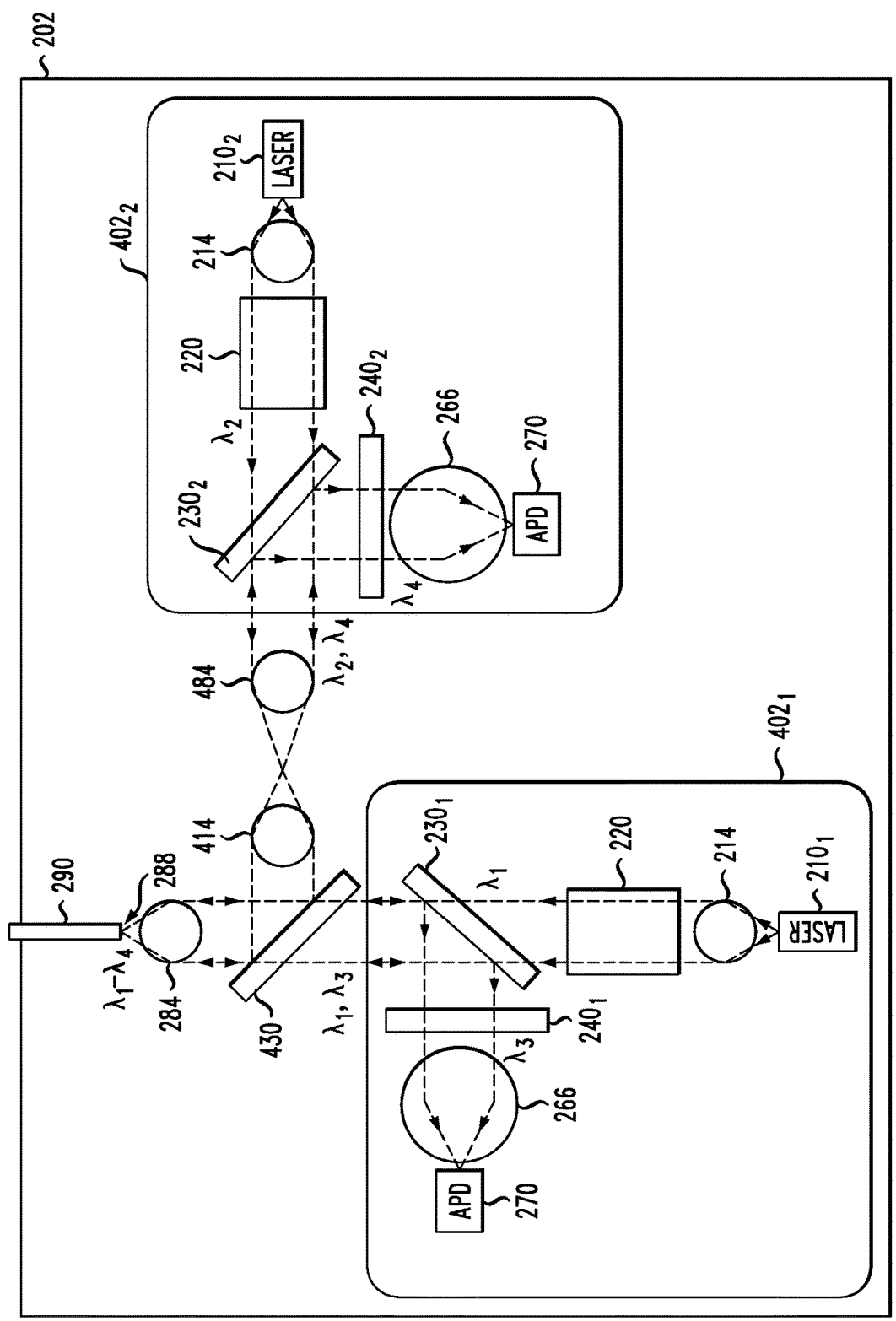
FIG. 4 shows a schematic top view of another electro-optical device that can be used in the optical communication system of FIG. 1 according to an embodiment.

FIG. 4 shows a schematic top view of an electro-optical device 400 that can be used to implement a WDM transceiver 102 (FIG. 1) according to an embodiment. The shown embodiment corresponds to N=2 (also see FIG. 1). For illustration purposes and without any implied limitations, device 400 is described below with wavelength notations corresponding to WDM transceiver $10_{2W}$. As described, device 400 can be used, e.g., in some of the above-described PON embodiments of system 100. A person of ordinary skill in the art will understand, without any undue experimentation, how to adapt device 400 for any pertinent uses in system 100 and/or other optical communication systems.

Device 400 is constructed using many of the same device elements/components as those used in device 200 (FIGS. 2-3). Such device elements/components are labeled in FIG. 4 using the same numerical labels as in FIG. 2. Label subscripts are used in FIG. 4 to indicate possible differences in the spectral characteristics of otherwise analogous device elements/components.

Device 400 comprises optical assemblies $402_1$ and $402_2$, both mounted on a main surface of substrate 202. According to the terminology used in some relevant literature, each of optical assemblies $402_1$ and $402_2$ may be referred to as a bidirectional optical sub-assembly or BOSA. That is, each of the optical assemblies $402_1$ and $402_2$ is configured to transmit and receive light via the corresponding same optical path.

In an example embodiment, optical assemblies $402_1$ and $402_2$ can be used to implement, e.g., individual optical transceivers $110_{1W}$ and $110_{2W}$, respectively. In such an embodiment, optical assembly $402_1$ is configured to operate using carrier wavelengths $\lambda_1$ and $\lambda_3$; and optical assembly $402_2$ is configured to operate using carrier wavelengths $\lambda_2$ and $\lambda_4$.

An optical wavelength diplexer 430 is used in device 400 to appropriately route the corresponding optical signals between fiber 290 and optical assemblies $402_1$ and $402_2$, e.g., as indicated in FIG. 4. Optical wavelength diplexer 430 is mounted on the top surface of substrate 202 and can be implemented using a filter slab similar to that used to implement optical wavelength diplexer 230, e.g., as described above (also see FIGS. 2-3). In operation, optical wavelength diplexer 430: (i) passes through the optical signals corresponding to the wavelengths $\lambda_1$ and $\lambda_3$; and (ii) reflects at an angle the optical signals corresponding to the wavelengths $\lambda_2$ and $\lambda_4$. The optical signals corresponding to the wavelengths $\lambda_1$ and $\lambda_3$ are coupled to optical assembly $402_1$ as indicated in FIG. 4. The optical signals corresponding to the wavelengths $\lambda_2$ and $\lambda_4$ are coupled to optical assembly $402_2$ as further indicated in FIG. 4. The latter optical coupling can be aided by the optional relay optics, e.g., comprising ball lenses 414 and 484 mounted on the top surface of substrate 202.

In optical assembly $402_1$, laser $210_1$ is configured to emit light of carrier wavelength $\lambda_1$. Optical wavelength diplexer $230_1$, which is optically coupled to optical wavelength diplexer 430 as indicated in FIG. 4, is an optical filter that: (i) passes through the optical signals in an optical band corresponding to the wavelength $\lambda_1$; and (ii) reflects at an angle the optical signals in an optical band corresponding to the wavelength $\lambda_3$. The optical properties of optical filter $240_1$ are such as to prevent most of spurious unwanted light from reaching the adjacent photodiode 270, while allowing the optical signals corresponding to the wavelength $\lambda_3$ to impinge on that photodiode.

In optical assembly $402_2$, laser $210_2$ is configured to emit light of carrier wavelength $\lambda_2$. Optical wavelength diplexer $230_2$, which is optically coupled to optical wavelength diplexer 430 as indicated in FIG. 4, is an optical filter that: (i) passes through the optical signals in an optical band corresponding to the wavelength $\lambda_2$; and (ii) reflects at an angle the optical signals in an optical band corresponding to the wavelength $\lambda_4$. The optical properties of optical filter $240_2$ are such as to prevent most of spurious unwanted light from reaching the adjacent photodiode 270, while allowing the optical signals corresponding to the wavelength $\lambda_4$ to impinge on that photodiode.

In some embodiments, one or both of ball lenses 414 and 484 may be replaced by suitable lenses of other shapes, e.g., various bulk optical lenses.

FIG. 5 shows a schematic top view of an electro-optical device 500 that can be used to implement a WDM transceiver 102 (FIG. 1) according to another embodiment. Although the shown embodiment corresponds to the number N>3 (also see FIG. 1), a person of ordinary skill in the art will understand how to scale and/or modify device 500 to adapt it to N=3 and/or to any technically feasible integer value of the number N, with N≥2. In this respect, device 500 provides an example of a scalable architecture, e.g., because it lends itself to relatively easy redesign for a different value of the number N by adding or removing a corresponding number of optical assemblies 402 and the corresponding filters 430. Some embodiments of device 500 also lend themselves to a relatively straightforward fabrication process, wherein different components are picked and placed on substrate 202 to produce free-space optical connections for the N transceivers of the device on the same substrate.

Device 500 is constructed using many of the same device elements/components as those used in device 400 (FIG. 4). Such device elements/components are labeled in FIG. 5 using the same numerical labels as in FIG. 4. Label subscripts are used in FIG. 5 to indicate possible differences in the spectral characteristics of otherwise analogous device elements/components.

Device 500 comprises an array of optical assemblies $402_1$-$402_N$ mounted on a main (e.g., top) surface of substrate 202. Optical assemblies $402_1$ and $402_2$ are labeled in FIG. 5 as $402_1'$ and $402_2'$ to indicate that different ones of these optical assemblies may be configured to use different sets of wavelengths than those indicated in reference to FIG. 4. In an example embodiment, each of optical assemblies $402_1$-$402_N$ of FIG. 5 may have a planar structure similar to that described in reference to FIG. 4 for optical assemblies $402_1$ and $402_2$ shown therein.

Optical assembly $402_1'$ is configured to use carrier wavelengths $\lambda_1$ and $\lambda_{N+1}$. Optical assembly $402_2'$ is configured to use carrier wavelengths $\lambda_2$ and $\lambda_{N+2}$. Optical assembly $402_3$ is configured to use carrier wavelengths $\lambda_3$ and $\lambda_{N+3}$, and so on. Optical assembly $402_N$ is configured to use carrier wavelengths $\lambda_N$ and $\lambda_{2N}$.

Device 500 further comprises a passive optical router 530 that operates to provide proper wavelength routing between optical fiber 290 and the various ones of optical assemblies $402_1$-$402_N$. In an example embodiment, optical router 530 is a substantially planar optical device mounted on the top surface of substrate 202. As shown, optical router 530 comprises a sequence of optical wavelength diplexers $430_1$-

$430_N$ and relay-optics sub-systems, wherein each of such sub-systems employs a respective pair of ball lenses 414 and 484. A person of ordinary skill in the art will understand that the shown placement of ball lenses 414 and 484 represents a non-limiting example of how the relay optics of device 500 can be configured and that other lens configurations are also possible. For example, some or all of the ball lenses 414 and 484 can be moved from the "through" optical path of passive optical router 530 to the corresponding "drop" optical paths, i.e. the optical paths between optical wavelength diplexers 430 and optical assemblies 402.

In an example embodiment, optical router 530 may have a plurality of bidirectional optical ports that include: (i) a first optical port 528; and (ii) N second optical ports $532_i$-$532_N$. Optical port 528 transmits light propagating between optical wavelength diplexer $430_1$ and end 288 of fiber 290. Optical port $532_1$ transmits light propagating between optical wavelength diplexer $430_1$ and optical assembly $402_1'$. Optical port $532_2$ transmits light propagating between optical wavelength diplexer $430_2$ and optical assembly $402_2'$. Optical port $532_3$ transmits light propagating between optical wavelength diplexer $430_3$ and optical assembly $402_3$. Optical port $532_N$ transmits light propagating between optical wavelength diplexer $430_N$ and optical assembly $402_N$.

Optical wavelength diplexer $430_1$ is an optical filter configured to: (i) pass through the optical signals corresponding to the wavelengths $\lambda_1$ and $\lambda_{N+1}$; and (ii) reflect at an angle the optical signals corresponding to the wavelengths $\lambda_2$, $\lambda_3, \ldots, \lambda_N, \lambda_{N+2}, \lambda_{N+3}, \ldots, \lambda_{2N}$. The optical signals corresponding to the wavelengths $\lambda_1$ and $\lambda_{N+1}$ are coupled through optical port $532_1$ to various optical components of optical assembly $402_1'$ in a manner similar to that described in reference to FIG. 4. The optical signals corresponding to the wavelengths $\lambda_2, \lambda_3, \ldots, \lambda_N, \lambda_{N+2}, \lambda_{N+3}, \ldots, \lambda_{2N}$ are directed towards optical wavelength diplexer $430_2$.

Optical wavelength diplexer $430_2$ is an optical filter configured to: (i) pass through the optical signals corresponding to the wavelengths $\lambda_3, \ldots, \lambda_N, \lambda_{N+3}, \ldots, \lambda_{2N}$; and (ii) reflect at an angle the optical signals corresponding to the wavelengths $\lambda_2$ and $\lambda_{N+2}$. The optical signals corresponding to the wavelengths $\lambda_2$ and $\lambda_{N+2}$ are coupled through optical port $532_2$ to various optical components of optical assembly $402_2'$ in a manner similar to that described in reference to FIG. 4. The optical signals corresponding to the wavelengths $\lambda_3, \ldots, \lambda_N, \lambda_{N+3}, \ldots, \lambda_{2N}$ are directed towards optical wavelength diplexer $430_3$.

Optical wavelength diplexer $430_3$ is an optical filter configured to: (i) pass through the optical signals corresponding to the wavelengths $\lambda_4, \ldots, \lambda_N, \lambda_{N+4}, \ldots, \lambda_{2N}$; and (ii) reflect at an angle the optical signals corresponding to the wavelengths $\lambda_3$ and $\lambda_{N+3}$. The optical signals corresponding to the wavelengths $\lambda_3$ and $\lambda_{N+3}$ are coupled through optical port $532_3$ to various optical components of optical assembly $402_3$ in a manner similar to that described in reference to FIG. 4. The optical signals corresponding to the wavelengths $\lambda_4, \ldots, \lambda_N, \lambda_{+4}, \ldots, \lambda_{2N}$ are directed towards optical wavelength diplexer $430_N$ and any intervening optical wavelength diplexers $430_n$ (if present, not explicitly shown in FIG. 5), where $n=4, \ldots, N-1$.

Optical wavelength diplexer $430_N$ is an optical filter configured to: (i) reflect at an angle the optical signals corresponding to the wavelengths $\lambda_N$ and $\lambda_{2N}$; and (i) block or otherwise discard other optical signals (if present). The optical signals corresponding to the wavelengths $\lambda_N$ and $\lambda_{2N}$ are coupled through optical port $532_N$ to various optical components of optical assembly $402_N$ in a manner similar to that described in reference to FIG. 4.

In one possible alternative embodiment, optical wavelength diplexer $430_N$ can be replaced by a mirror or other suitable light reflector.

In another possible alternative embodiment, optical wavelength diplexer $430_N$ can be removed, and optical assembly $402_N$ can be repositioned to directly optically couple to the next upstream optical wavelength diplexer 430 (e.g., optical wavelength diplexer $430_{N-1}$, not explicitly shown in FIG. 5). An example of such repositioning can be obtained by examining the relative positions of optical wavelength diplexer 430 and optical assembly $402_2$ shown in FIG. 4.

In an example embodiment, passive optical router 530 performs an optical function similar to that of a multi-port optical add-drop multiplexer. More specifically, such an optical add-drop multiplexer can be designed and configured to: (i) drop optical signals corresponding to the carrier wavelengths $\lambda_{N+1}, \ldots, \lambda_{2N}$ at different respective optical ports thereof; and (ii) add optical signals corresponding to the carrier wavelengths $\lambda_1, \ldots, \lambda_N$ at said different respective optical ports thereof. Based on the above description, a person of ordinary skill in the art will understand how to make and use alternative (e.g., grating-based) embodiments of passive optical router 530.

In some alternative embodiments, passive optical router 530 may be optically coupled to more than one optical fiber 290.

For example, in one alternative embodiment, another optical fiber 290 and another ball lens 284 can be placed in device 500 next to optical wavelength diplexer $430_n$ (where $n=2, 3, \ldots, N-1$) in a planar arrangement similar to that of the shown optical fiber 290, ball lens 284, and optical wavelength diplexer $430_1$. As a non-limiting example, FIG. 5 indicates, with a dashed line $290_3$, a possible location of such another optical fiber 290 coupled to optical wavelength diplexer $430_3$.

In another alternative embodiment, another optical fiber 290 and another ball lens 284 can replace one of optical assemblies $402_2$-$402_N$ in device 500.

A person of ordinary skill in the art will understand how to change the relevant optical characteristics of some or all of the optical wavelength diplexers 430 in the above-indicated alternative embodiments of device 500 to implement various wavelength routing schemes with respect to the shown optical fiber 290 and said another optical fiber 290.

Some wavelength plans for device 500 may rely on wavelength-diplexer slabs 430 designed for a relatively steep angle of light-beam incidence (e.g., smaller than 45 degrees with respect to the normal). In such embodiments, respective mirrors (not shown in FIG. 5) may be used in conjunction with at least some of the wavelength-diplexer slabs 430 to realize a more compact placement of the various wavelength-diplexer slabs 430 and for the tight optical coupling of the corresponding optical elements in passive optical router 530.

In an example embodiment, passive optical router 530 can be used to implement the whole or a portion of a MUX/DMUX 120 (also see FIG. 1).

According to an example embodiment disclosed above, e.g., in the summary section and/or in reference to any one or any combination of some or all of FIGS. 1-5, provided is an apparatus comprising: a substrate (e.g., 202, FIG. 4) having a substantially planar surface (e.g., 302, FIG. 3); first and second optical transceivers (e.g., $402_1$, $402_2$, FIG. 4) fixed to said substrate adjacent and along said planar surface, the first and second optical transceivers having non-overlapping footprints on said planar surface (e.g., as in FIG. 4);

and a passive optical filter (e.g., 430, FIG. 4) fixed to said substrate and configured to direct along said planar surface, between an end face (e.g., 288, FIG. 4) of an optical fiber (e.g., 290, FIG. 4) and the first optical transceiver, light of first wavelengths (e.g., $\lambda_1$, $\lambda_3$, FIG. 4), and to direct along said planar surface, between the end face and the second optical transceiver, light of second wavelengths (e.g., $\lambda_2$, $\lambda_4$, FIG. 4), the first wavelengths being different from the second wavelengths.

In some embodiments of the above apparatus, the apparatus further comprises a connector (e.g., 390, FIG. 3) fixed to said substrate to stabilize an end segment of the optical fiber along said planar surface, the end segment including the end face.

In some embodiments of any of the above apparatus, the apparatus further comprises one or more bulk lenses (e.g., 284, 414, 484, FIG. 4) fixed to said substrate to direct a light beam between the end face and the first optical receiver substantially parallel to said planar surface, and to direct a light beam between the end face and the second optical receiver substantially parallel to said planar surface.

In some embodiments of any of the above apparatus, the one or more bulk lenses include an optical relay system (e.g., 414, 484, FIG. 4) to direct a light beam between the passive optical filter and the second optical receiver.

In some embodiments of any of the above apparatus, each of the optical transceivers includes a respective photodiode (e.g., 270, FIG. 4) configured to receive light from the end face via a respective first optical path through the optical transceiver and includes a respective light source (e.g., 210, FIG. 4) configured to transmit light to the end face via a respective second optical path through the optical transceiver, each of said respective first and second optical paths being substantially parallel to said planar surface.

In some embodiments of any of the above apparatus, each of the optical transceivers includes a respective slab-like optical filter (e.g., 230, FIG. 4) having main surfaces thereof normal to said planar surface and optically coupling both the respective photodiode and the respective light source to the passive optical filter.

In some embodiments of any of the above apparatus, each of the optical transceivers comprises a respective coherent optical detector that includes the respective photodiode.

In some embodiments of any of the above apparatus, the passive optical filter comprises an optical slab (e.g., 430, FIG. 4) fixed to said substrate and having main surfaces thereof normal to said planar surface.

In some embodiments of any of the above apparatus, the optical slab is configured to transmit therethrough light of the first wavelengths and to reflect therefrom light of the second wavelengths.

In some embodiments of any of the above apparatus, the apparatus further comprises a passive optical router (e.g., 530, FIG. 5) that includes the passive optical filter, the passive optical router having a first optical port (e.g., 528, FIG. 5) and three or more second optical ports (e.g., $532_1$-$532_N$, FIG. 5), the first optical port being configured to transmit light propagating between the passive optical router and the end face, one of the second optical ports being configured to transmit light propagating between the passive optical router and the first optical transceiver, and another one of the second optical ports being configured to transmit light propagating between the passive optical router and the second optical transceiver.

In some embodiments of any of the above apparatus, the passive optical router is fixed to said substrate adjacent and along said planar surface and has a footprint on said planar surface non-overlapping with the footprints of the first and second optical transceivers (e.g., as in FIG. 5).

In some embodiments of any of the above apparatus, the passive optical router comprises a sequence of optical slabs (e.g., $430_1$-$430_N$, FIG. 5) optically coupled to one another and to the end face, each of the slabs having main surfaces thereof normal to said planar surface.

In some embodiments of any of the above apparatus, the apparatus further comprises one or more additional optical transceivers (e.g., $402_3$-$402_N$, FIG. 5) fixed to said substrate adjacent and along said planar surface, each of said one or more additional optical transceivers having a footprint on said planar surface that does not overlap with the footprints of other optical transceivers thereon (e.g., as in FIG. 5); and wherein the passive optical router is configured to direct light between the end face and each one of the first, second, and additional optical transceivers through a respective one of the second optical ports.

In some embodiments of any of the above apparatus, the passive optical router is a part of an optical add-drop multiplexer.

In some embodiments of any of the above apparatus, different ones of the second optical ports are configured to transmit light of different respective non-overlapping sets of wavelengths.

In some embodiments of any of the above apparatus, each of the first and second optical ports is a bidirectional optical port.

In some embodiments of any of the above apparatus, the passive optical router is configured to receive light from or transmit light to an end face of another optical fiber (e.g., $290_3$, FIG. 5) along said planar surface.

While this disclosure includes references to illustrative embodiments, this specification is not intended to be construed in a limiting sense.

For example, while various embodiments are described above as being constructed using ball lenses, other suitable lenses and/or lens systems may also be used in at least some alternative embodiments.

Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use (if any) of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Throughout the detailed description, the drawings, which are not to scale, are illustrative only and are used in order to explain, rather than limit the disclosure. The use of terms such as height, length, width, top, bottom, is strictly to facilitate the description of the embodiments and is not intended to limit the embodiments to a specific orientation. For example, height does not imply only a vertical rise limitation, but is used to identify one of the three dimensions of a three dimensional structure as shown in the figures. Such "height" would be vertical where the corresponding substrate is horizontal but would be horizontal where the corresponding substrate is vertical, and so on.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure.

What is claimed is:

1. An apparatus, comprising:
a substrate having a substantially planar main surface;
first and second optical transceivers fixed to said substrate adjacent and along said planar main surface, the first and second optical transceivers having footprints on said planar main surface, the footprints being non-overlapping with each other; and
a passive optical filter fixed to said substrate and configured to direct along said planar main surface, between an end face of an optical fiber and the first optical transceiver, light of first wavelengths, and to direct along said planar main surface, between the end face and the second optical transceiver, light of second wavelengths, the first wavelengths being different from the second wavelengths.

2. The apparatus of claim 1, further comprising a connector fixed to said substrate to stabilize an end segment of the optical fiber along said planar main surface, the end segment including the end face.

3. The apparatus of claim 1, further comprising one or more bulk lenses fixed to said substrate to direct a light beam between the end face and the first optical receiver substantially parallel to said planar main surface, and to direct a light beam between the end face and the second optical receiver substantially parallel to said planar main surface.

4. The apparatus of claim 3, wherein the one or more bulk lenses include an optical relay system to direct a light beam between the passive optical filter and the second optical receiver.

5. The apparatus of claim 1, wherein each of the optical transceivers includes a respective photodiode configured to receive light from the end face via a respective first optical path through the optical transceiver and includes a respective light source configured to transmit light to the end face via a respective second optical path through the optical transceiver, each of said respective first and second optical paths being substantially parallel to said planar main surface.

6. The apparatus of claim 5, wherein each of the optical transceivers includes a respective slab-like optical filter having main surfaces thereof normal to said planar main surface and optically coupling both the respective photodiode and the respective light source to the passive optical filter.

7. The apparatus of claim 5, wherein each of the optical transceivers comprises a respective coherent optical detector that includes the respective photodiode.

8. The apparatus of claim 1, wherein the passive optical filter comprises an optical slab fixed to said substrate and having main surfaces thereof normal to said planar main surface.

9. The apparatus of claim 8, wherein the optical slab is configured to transmit therethrough light of the first wavelengths and to reflect therefrom light of the second wavelengths.

10. The apparatus of claim 1, further comprising a passive optical router that includes the passive optical filter, the passive optical router having a first optical port and three or more second optical ports, the first optical port being configured to transmit light propagating between the passive optical router and the end face, one of the second optical ports being configured to transmit light propagating between the passive optical router and the first optical transceiver, and another one of the second optical ports being configured to transmit light propagating between the passive optical router and the second optical transceiver.

11. The apparatus of claim 10, wherein the passive optical router is fixed to said substrate adjacent and along said planar main surface and has a footprint on said planar main surface non-overlapping with the footprints of the first and second optical transceivers on said planar main surface.

12. The apparatus of claim 10, wherein the passive optical router comprises a sequence of optical slabs optically coupled to one another and to the end face, each of the slabs having main surfaces thereof normal to said planar main surface.

13. The apparatus of claim 10, further comprising one or more additional optical transceivers fixed to said substrate adjacent and along said planar main surface, each of said one or more additional optical transceivers having a footprint on said planar main surface that does not overlap with the footprints of other optical transceivers thereon; and
wherein the passive optical router is configured to direct light between the end face and each one of the first, second, and additional optical transceivers through a respective one of the second optical ports.

14. The apparatus of claim 10, wherein the passive optical router is a part of an optical add-drop multiplexer.

15. The apparatus of claim 10, wherein different ones of the second optical ports are configured to transmit light of different respective non-overlapping sets of wavelengths.

16. The apparatus of claim 10, wherein each of the first and second optical ports is a bidirectional optical port.

17. The apparatus of claim 10, wherein the passive optical router is configured to receive light from or transmit light to an end face of another optical fiber along said planar main surface.

18. The apparatus of claim 1, wherein the substrate comprises electrical connections to one or more circuits mounted on the substrate, at least one of the first and second optical transceivers including at least one of said one or more circuits.

19. The apparatus of claim 18, wherein the electrical connections comprise a patterned metal layer located within a body of the substrate or on the substantially planar main surface.

20. The apparatus of claim 1, wherein the substrate comprises a semiconductor wafer or a silicon optical bench.

\* \* \* \* \*